July 1, 1924.
T. T. H. FERGUSON
INDICATOR
Filed June 21, 1922 3 Sheets-Sheet 1
1,500,065
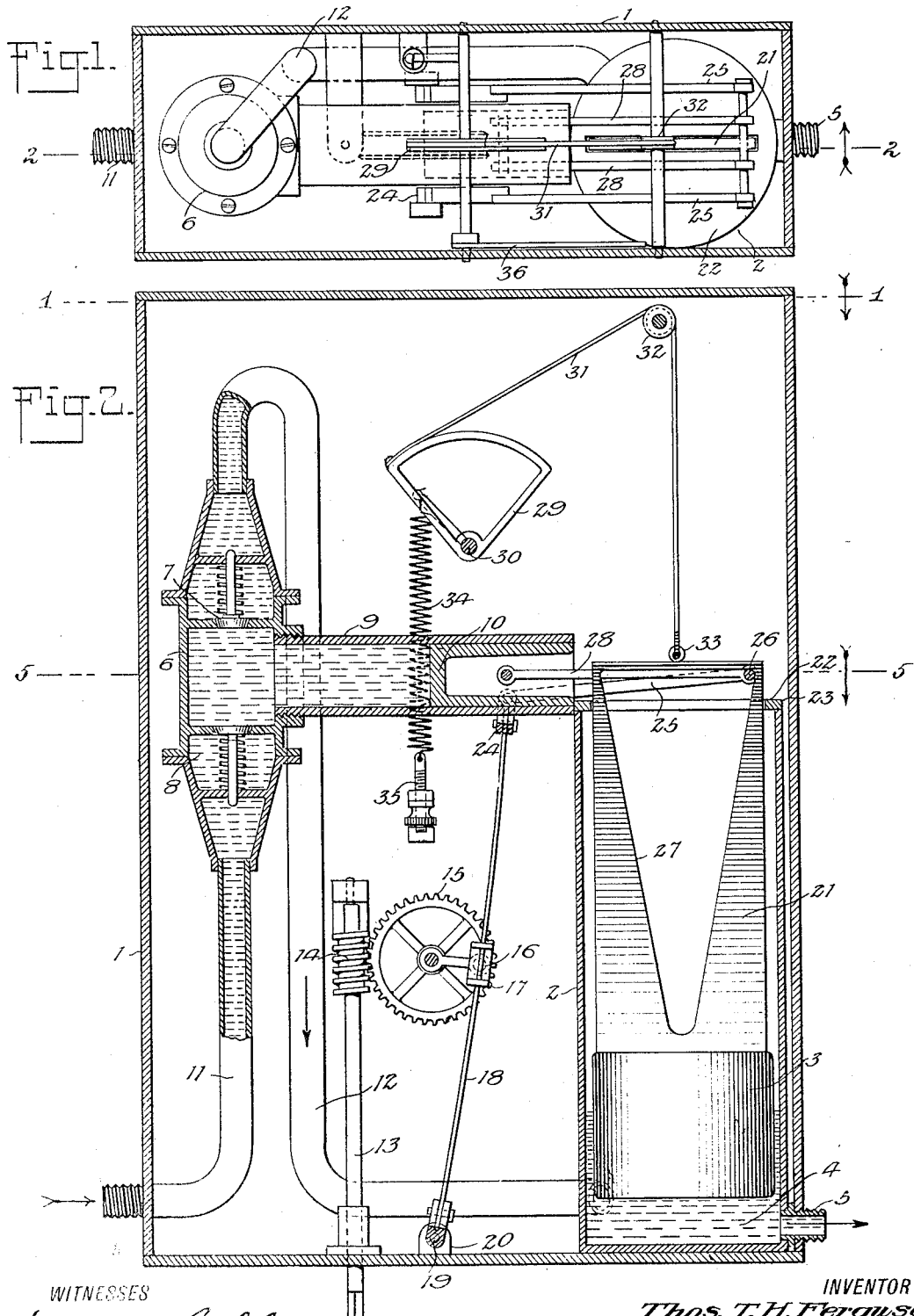
WITNESSES
William P. Goebel.
S. W. Foster
INVENTOR
Thos. T. H. Ferguson
BY Munn & Co
ATTORNEYS July 1, 1924.  
T. T. H. FERGUSON  
INDICATOR  
Filed June 21, 1922  
1,500,065  
3 Sheets-Sheet 2

WITNESSES  
William P. Goebel  
S. W. Foster

INVENTOR  
Thos. T. H. Ferguson  
BY  
ATTORNEYS

July 1, 1924.

T. T. H. FERGUSON

INDICATOR

Filed June 21, 1922

WITNESSES

INVENTOR
Thos. T. H. Ferguson
BY
ATTORNEYS

Patented July 1, 1924.

1,500,065

UNITED STATES PATENT OFFICE.

THOMAS T. H. FERGUSON, OF BILTHOVEN, NETHERLANDS.

INDICATOR.

Application filed June 21, 1922. Serial No. 570,040.

*To all whom it may concern:*

Be it known that I, THOMAS T. H. FERGUSON, a citizen of the Netherlands, and a resident of Bilthoven, in the Province of Utrecht and State of the Netherlands, have invented a new and Improved Indicator, of which the following is a full, clear, and exact description.

This invention relates to improvements in indicators, and more particularly to a consumption rate indicator for liquid fuel, an object of the invention being to provide an apparatus which will indicate the fuel consumption per mile or engine revolution or in other words, will indicate the consumption in combination with the time or distance element, or engine function.

A further object is to provide an indicator of the character described which automatically controls the flow, and registers the consumption of liquid fuel, such as petrol (gasoline), or any other liquid fuel, and which apparatus is especially designed for use in connection with internal combustion engines of motor vehicles.

A further object is to provide an indicator of the character stated, which will show at all times the fuel consumption or rate of fuel consumption, and serve as a warning device when the consumption is abnormal, so that the operator can employ corrective means for adjustments.

With these and other objects in view, the invention consists in certain novel features of construction, and combinations and arrangements of parts, as will be more fully hereinafter described and pointed out in the claims.

In the accompanying drawings—

Figure 1 is a sectional plan view of my improved indicator, the section being taken on the line 1—1, of Figure 2.

Figure 2 is a view in vertical or longitudinal section on the line 2—2, of Figure 1, parts being in section and parts in elevation, and partly diagrammatic.

Figure 3:
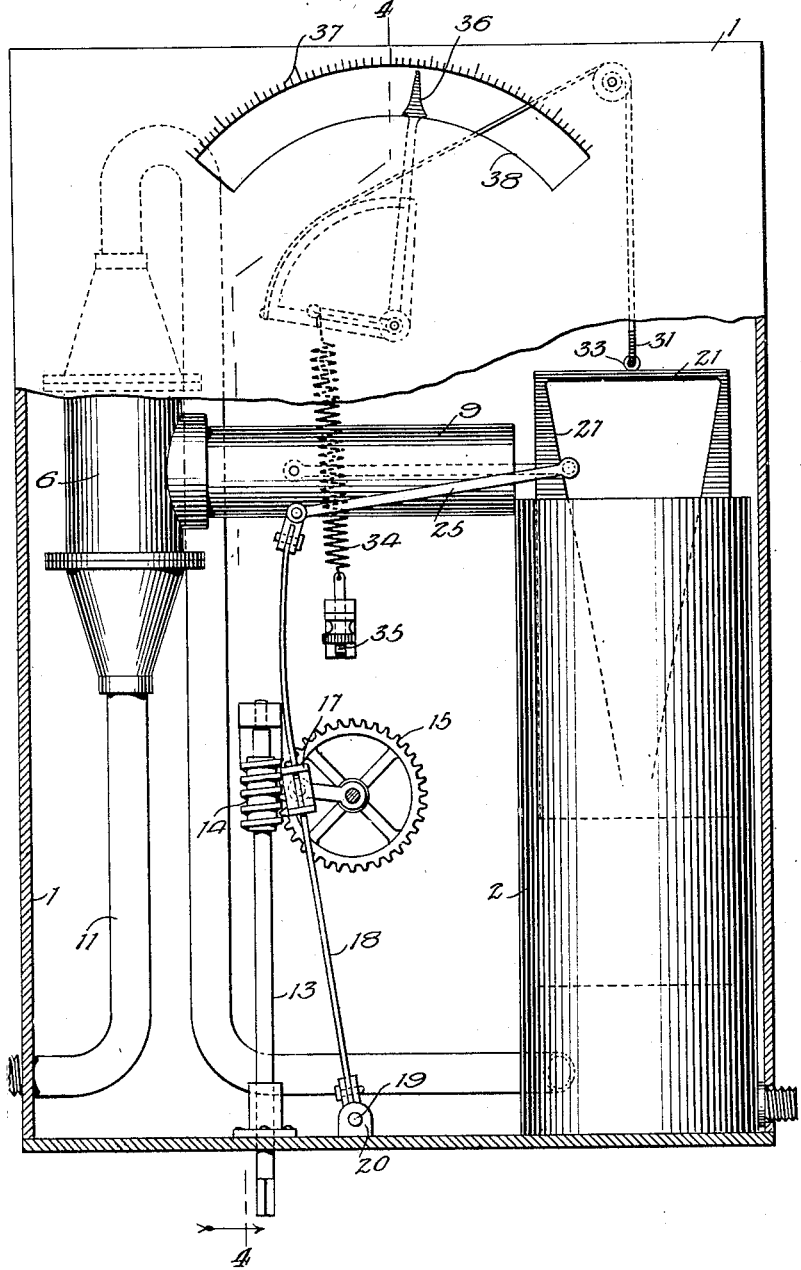
Figure 3 is a view in elevation with the casing partly broken away showing the parts in a position different from that shown in Figure 2.
Figure 4:
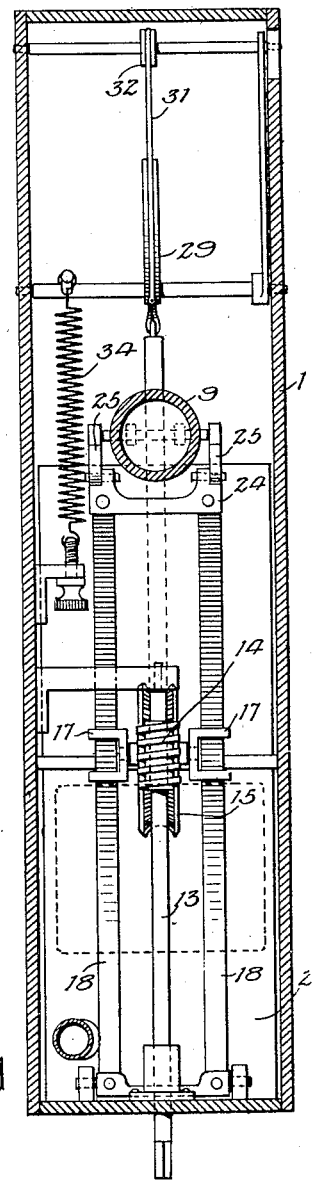
Figure 4 is a view in vertical transverse section on the staggered line 4—4, of Figure 3.
Figure 5:
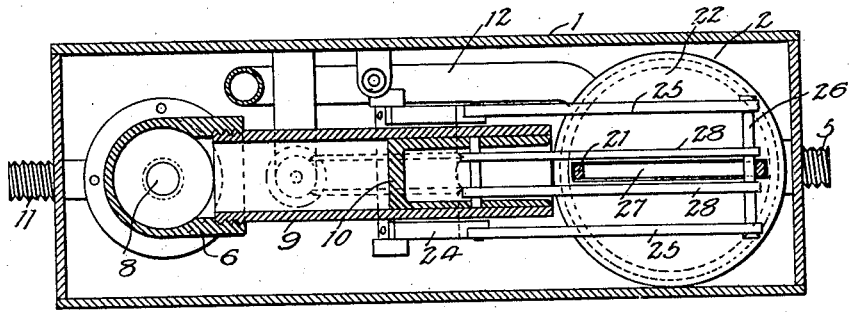
Figure 5 is a view in horizontal transverse section on the line 5—5, of Figure 2.

1 represents a casing and 2 a tank located in the casing and serving as a housing for a float 3, the latter being of such weight as to be partially submerged within the liquid fuel 4, in the bottom of the tank 2. An outlet nipple 5 communicates with the bottom of tank 2 and projects through casing 1 and is adapted to be connected to a carburetter and supply liquid fuel thereto.

6 represents a pump having a pair of check valves 7 and 8 controlling the direction of flow of the liquid, and said pump is made with a cylinder in which a reciprocating plunger 10 is mounted.

Liquid is supplied to the pump 6 through a pipe 11, the latter adapted to be connected to a tank, or source of supply, not shown. The outlet of the pump is connected by a pipe 12 with the lower end of tank 2 and supplies liquid thereto.

13 represents a shaft which projects through the casing 2 and may be connected to the speedometer shaft, or any other suitable turning member of an automobile, or other engine structure to which rotary motion is imparted.

A worm 14 is provided on the shaft 13 and transmits motion to a worm wheel 15, the latter provided with a crank pin 16 on which blocks 17 are mounted.

These blocks 17 are mounted to slide on spring arms 18, the latter being pivotally connected as shown at 19, to a bracket 20 on the bottom of casing 1.

The float 3 above referred to, has fixed thereto a vertically positioned blade 21, which projects through a slot 22 in the top 23 of tank 2, the end walls of said slot serving to hold the blade 21 against lateral displacement, but permitting free longitudinal movement of the blade.

A transversely positioned bracket 24 is secured on the upper ends of spring arms 18 and the ends of this bracket 24 are connected by links 25 with a cross rod 26. This rod 26 projects through a triangular shaped opening 27 in blade 21, said opening 27 being widest at its upper portion and gradually tapering to its lower end.

A pair of links 28 connect the cross rod 26 with the plunger 10 so that the movement of said cross rod imparts reciprocating motion to the plunger 10, all of which will be more fully hereinafter explained.

A segment 29 is pivotally mounted as shown at 30 and has fixed thereto one end of a strap, or other flexible connecting device 31, which latter is passed over an idle pulley 32 and secured at its opposite end to an eye 33 on the upper end of blade 21.

A coil spring 34 is connected to the segment 29 and is provided with an adjusting screw 35 to regulate the tension thereof and correspondingly regulate the resistance to the downward movement of blade 21 and permit the proper balance to be had.

A pointer 36 is fixed to turn with the segment 29 and registers with a scale 37 on the casing 1, the pointer being observable through a slot 38 in casing 1.

The operation of my improved apparatus above described is as follows:

Motion is transmitted from shaft 13 through the worm 14 and worm wheel 15 to impart an elastic oscillatory motion to the spring arms 18 as the blocks 17 are carried in the path of a circle by means of the crank pin 16 and during such movement have a sliding, or reciprocating movement on the spring arms 18. This movement of the arms 18 through the medium of the links 25, rod 26, and links 28, impart a reciprocating movement to the plunger 10 to force the liquid in the direction of the arrows in the bottom of tank 2.

If the fuel is not consumed as rapidly as it is forced by the pump, it will accumulate in tank 2, causing the float and blade 21 to elevate. As the blade 21 elevates, the stroke permitted the rod 26, is reduced because of the fact that this rod moves transversely of the blade 21 in the opening 27 and this opening reduces in width longitudinally of the blade so that correspondingly the stroke of the plunger is reduced as the blade 21 rises. A compensation for such differences of stroke is made by the elastic or spring nature of the arms 18.

Hence it will be noted that the rising of the blade 21 will cause a reduction in stroke of the plunger 10, thus reducing the amount of flow of the liquid and causing the parts to ultimately return to normal. The movement of the blade 21 is imparted to the segment 29 by means of the strap 31 so that the pointer 36 is caused to move correspondingly and register such movement which indicates the consumption of fuel in a given time, or in a given distance, as the case may be.

Figure 6:
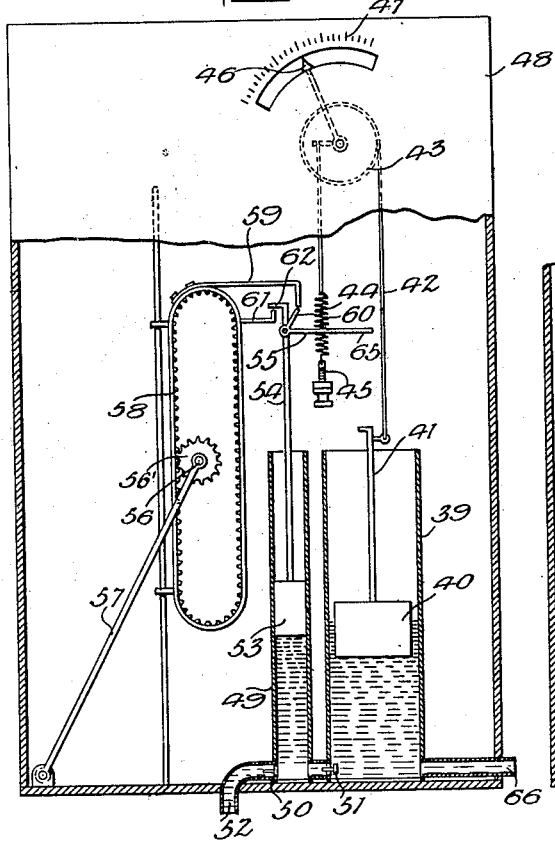
Figures 6 and 7 are views partly in section and partly in elevation and partly diagrammatic, illustrating a modification.
Figure 7:
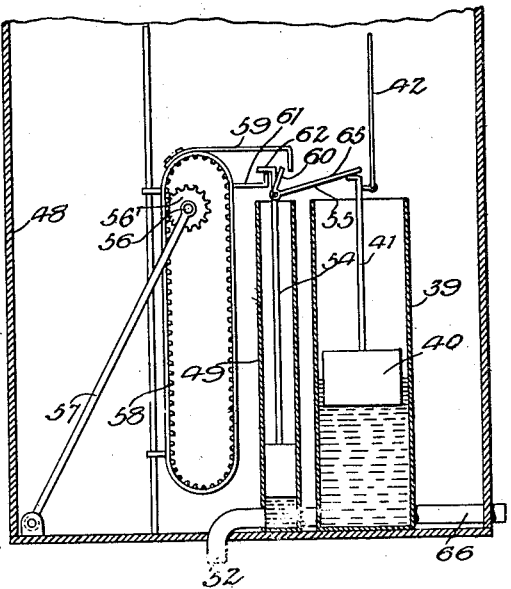

In Figures 6 and 7 of the drawings I illustrate a modified form of apparatus which will now be described.

39 represents a vertical tank corresponding to tank 2 of the preferred form and in which a float 40 is mounted and provided with a vertical standard 41. This standard 41 is connected to a strap or other flexible connecting device 42 which is passed over a wheel or pulley 43 and secured by spring 44 with an adjusting device 45 to secure the necessary balance. Pointer 46 is operatively connected to move with the pulley 43 and registers with the scale 47 and the casing 48.

A vertically positioned pump cylinder 49 is located adjacent to the tank 39 and check valves 50 and 51 control the flow of fuel from an inlet 52 through the pump 49 into tank 39, the latter being provided with an outlet 66. In cylinder 49 a plunger 53 is located and provided with a rod 54 projecting above the cylinder and having a bell-crank-lever 55 pivotally connected thereto and shown in Figure 6 in its normal position.

56' represents a driving pinion which is mounted on a shaft 56, the latter adapted to be connected by a universal or flexible connection with a speedometer shaft or driving mechanism, as may be desired. This shaft 56 is mounted in the free end of the pivoted arm 57 to permit the necessary lateral movement within an elliptical internally toothed rack 58 so that the rotary motion of the pinion imparts a vertical reciprocating movement to rack 58.

An angle arm 59 is fixed to the upper portion of rack 58 and is adapted, when the rack moves downwardly, to engage the shorter member 60 of the bell crank lever 55, and compel the plunger to move downwardly therewith, it being understood that further pivotal movement in a downward direction than that shown in Figure 6, is limited in any approved manner, but that the bell-crank-lever has an upward pivotal movement for purpose which will hereinafter appear.

The upward stroke of the plunger 53 is caused by an arm 61 on the rack 58 engaging a finger 62 on the plunger 54.

It will be noted that the longer member 65 of bell-crank-lever 55, is in the path of movement of the upper end of the float standard 41, so that when the lever 55 strikes the upper end of the standard 41, it will be caused to pivot in a direction to release the lever from engagement with the arm 59 as shown in Figure 7, thus terminating the downward stroke of the plunger 53, hence the position of the standard 41 controls the length of stroke of the pump plunger 53 and the results accomplished are similar to those explained in connection with the preferred form of my invention.

While I have given a detail description of the mechanical parts of the apparatus indicated, it is to be understood that my invention is not limited to the particular mechanical details nor to their exact arrangement, as a great many changes might be made in the general form and arrangement of parts without departing from my invention. I, therefore, do not limit myself to the precise details set forth, but consider myself at liberty to make such changes and alterations as fairly fall within the spirit and scope of the appending claims.

I claim:

1. In a device of the character described, a tank from which the fuel is supplied to an engine, a pump for feeding the fuel to the tank, means for operating the pump, a float in the tank, and means for controlling the operation of the pump from the float by the rise and fall thereof due to the amount of fuel in the tank.

2. In a device of the character described, a tank from which the fuel is supplied to an engine, a pump having a reciprocating piston for feeding the fuel to the tank, means for operating the pump, a float in the tank, and means for controlling the length of stroke of the piston of the pump from the float.

3. In a device of the character described, a tank from which fuel is fed to an engine, a pump having a reciprocating piston for feeding the fuel to the tank, means for operating the pump, a float in the tank, and means controlled by the float and connected with the pump piston and controlling the length of stroke of the same.

4. In a device of the character described, a tank from which the fuel is fed to an engine, a pump having a reciprocating piston for feeding the fuel to the tank, means for operating the pump, a float in the tank, means connecting the float with the pump piston and controlling the stroke thereof, an indicator, and means connecting the float with the indicator for operating said indicator.

5. A device of the character described, comprising a fuel feeding pump, a float controlled by the fuel feed, an indicator, a connection between the float and indicator for operating the latter from the former, and means controlling the stroke of the pump plunger in accordance with the position of the float.

6. A device of the character described, comprising a fuel feeding reciprocating pump, a float movable by the level of fuel in accordance with the feed thereof, a blade on the float having a slot therein, the walls of said slot converging from one end thereof to the other, a device movable transversely of the slot and operatively connected to the plunger, and means for imparting motion to said device.

7. A device of the character described, comprising a fuel feeding reciprocating pump, a float movable by the level of fuel in accordance with the feed thereof, a blade on the float having a slot therein, the walls of said slot converging from one end thereof to the other, a device movable transversely of the slot and operatively connected to the plunger, a pivotally mounted spring arm, a link connecting the free end of said spring arm with said device, and means for imparting oscillatory motion to said arm.

8. A device of the character described, comprising a fuel feeding reciprocating pump, a float movable by the level of fuel in accordance with the feed thereof, a blade on the float having a slot therein, the walls of said slot converging from one end thereof to the other, a device movable transversely of the slot and operatively connected to the plunger, a pivotally mounted spring arm, a link connecting the free end of said spring arm with said device, means for imparting oscillatory motion to said arm, said last mentioned means comprising a rotary crank wheel and a block connected to the crank pin of said wheel and having sliding movement on the spring arm.

9. In a device of the character described, a feed pump, means for operating the pump, a tank having an outlet end into which the fuel is fed by the pump, a float in the tank, a cross head connected with the pump operating means and pump piston, and means carried by the float and controlling the movement of the cross head.

10. In a device of the character described, a feed pump, means for operating the pump, a tank having an outlet and into which the fuel is fed by the pump, a float in the tank having a cam surface, a cross head engaging the cam surface and means connecting the cross head with the pump operating means and pump pistons.

THOMAS T. H. FERGUSON.